US010159028B2

United States Patent
Lei et al.

(10) Patent No.: US 10,159,028 B2
(45) Date of Patent: Dec. 18, 2018

(54) METHOD AND APPARATUS FOR DYNAMIC TELEMATICS NETWORK SELECTION AND UTILIZATION

(71) Applicant: FORD GLOBAL TECHNOLOGIES, LLC, Dearborn, MI (US)

(72) Inventors: Oliver Lei, Windsor (CA); Allen R. Murray, Lake Orion, MI (US); David Joseph Orris, Allen Park, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 34 days.

(21) Appl. No.: 15/157,018

(22) Filed: May 17, 2016

(65) Prior Publication Data

US 2017/0339617 A1 Nov. 23, 2017

(51) Int. Cl.
| | |
|---|---|
| H04W 36/30 | (2009.01) |
| H04B 17/318 | (2015.01) |
| H04L 12/26 | (2006.01) |
| H04L 29/08 | (2006.01) |
| H04W 48/18 | (2009.01) |
| H04W 8/18 | (2009.01) |
| H04W 36/14 | (2009.01) |
| H04W 8/20 | (2009.01) |

(52) U.S. Cl.
CPC .......... *H04W 36/30* (2013.01); *H04B 17/318* (2015.01); *H04L 43/16* (2013.01); *H04L 67/12* (2013.01); *H04L 67/30* (2013.01); *H04W 48/18* (2013.01); *H04W 8/183* (2013.01); *H04W 8/205* (2013.01); *H04W 36/14* (2013.01)

(58) Field of Classification Search
CPC ....... H04B 1/3822; H04L 67/12; H04L 67/34; H04W 72/048
See application file for complete search history.

(56) References Cited

U.S. PATENT DOCUMENTS

| | | | | |
|---|---|---|---|---|
| 8,346,255 | B2 | 1/2013 | Kukuchka et al. | |
| 8,818,719 | B1* | 8/2014 | Thanayankizil | G07C 5/008 340/988 |
| 9,532,203 | B2* | 12/2016 | Okawa | H04W 8/18 |
| 2014/0120859 | A1* | 5/2014 | Ekici | H04W 4/22 455/404.1 |
| 2014/0274006 | A1* | 9/2014 | Mutya | H04W 36/14 455/416 |
| 2014/0310785 | A1 | 10/2014 | Prabdial et al. | |
| 2015/0358798 | A1* | 12/2015 | Okawa | H04W 8/18 455/404.2 |
| 2015/0382286 | A1 | 12/2015 | Daoud | |
| 2017/0024201 | A1* | 1/2017 | Diedrich | G06F 8/65 |
| 2017/0196026 | A1* | 7/2017 | Daoud | H04W 4/021 |
| 2017/0289790 | A1* | 10/2017 | Singh | H04W 8/183 |

* cited by examiner

*Primary Examiner* — Liton Miah
(74) *Attorney, Agent, or Firm* — Jennifer Stec; Brooks Kushman P.C.

(57) ABSTRACT

A system includes a vehicle-based processor configured to store SIM profiles of locally connectable wireless devices on a list in vehicle memory. The processor is also configured to monitor the network signal strengths of different networks associated with different SIM profiles as a vehicle travels and, if the signal strength of the presently connected network drops below a predetermined threshold, automatically select and connect to a different cellular network using an associated stored SIM profile.

18 Claims, 4 Drawing Sheets

METHOD AND APPARATUS FOR DYNAMIC TELEMATICS NETWORK SELECTION AND UTILIZATION

TECHNICAL FIELD

The illustrative embodiments generally relate to a method and apparatus for dynamic telematics network selection and utilization.

BACKGROUND

Vehicular telematics services utilize cellular networks to provide connectivity between the vehicle and remote networks and devices. These cellular networks are accessed using, for example, an onboard modem or a user cellular device connected to a telematics control unit (TCU).

In one example, a TCU connects to an embedded vehicle modem which may have a cellular identification number or account assigned thereto. This account may be uniquely registered for a vehicle, and may be different from a user's cellular phone account. In another example, the TCU may connect to a user's cellular phone, such as through a wireless or wired connection, and may utilize the cellular connection provided through the phone to send and receive data from remote networks.

In a vehicle environment, the onboard modem and/or TCU may be provided with a more powerful antenna than a typical cellular phone. Additionally, the vehicle itself may attenuate a signal from a cellular phone, reducing coverage. Unfortunately, it can be difficult for a user cellular phone to utilize a vehicle's cellular antenna. As a result, cellular services may be negatively impacted by the vehicle environment, or at least may be less powerful in terms of signal strength than services provided through an embedded vehicle cellular device.

Multiple cellular devices may be available for connection to or may be connected to a vehicle computer. Which particular device is chosen for use is commonly determined by user preference settings (e.g., without limitation, a primary driver's device may be designated as a primary use device, and other passenger devices may be designated as secondary devices when the primary device is not present).

SUMMARY

In a first illustrative embodiment, a system includes a vehicle-based processor configured to store SIM profiles of a locally connectable wireless device in vehicle memory. The processor is also configured to monitor the network signal strengths of different networks associated with different SIM profiles as a vehicle travels and, if the signal strength of a presently connected network drops below a predetermined threshold, automatically select and connect to a new network associated with one of the stored SIM profiles.

In a second illustrative embodiment, a computer-implemented method includes automatically selecting and connecting to, via a telematics control unit, a second network associated with a previously stored SIM profile, responsive to a determination that a signal strength of a first network has dropped below a predetermined threshold, the SIM profile representing a wireless network associated with a locally connectable wireless device.

In a third illustrative embodiment, a computer-implemented method includes automatically selecting and connecting to, via a telematics control unit, a new network associated with a previously stored SIM profile and corresponding SIM profile connection information, responsive to a signal strength of a currently connected network dropping below a predetermined threshold. In this embodiment, the previously stored SIM profiles identify wireless networks associated with locally connectable wireless devices and the connection is established using the previously stored SIM profile connection information. Also, in this embodiment, the method connects to the new network following issuance of an instruction to a device, from which the SIM profile associated with the new network was obtained, to de-register from the new network.

DETAILED DESCRIPTION

As required, detailed embodiments are disclosed herein; however, it is to be understood that the disclosed embodiments are merely illustrative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
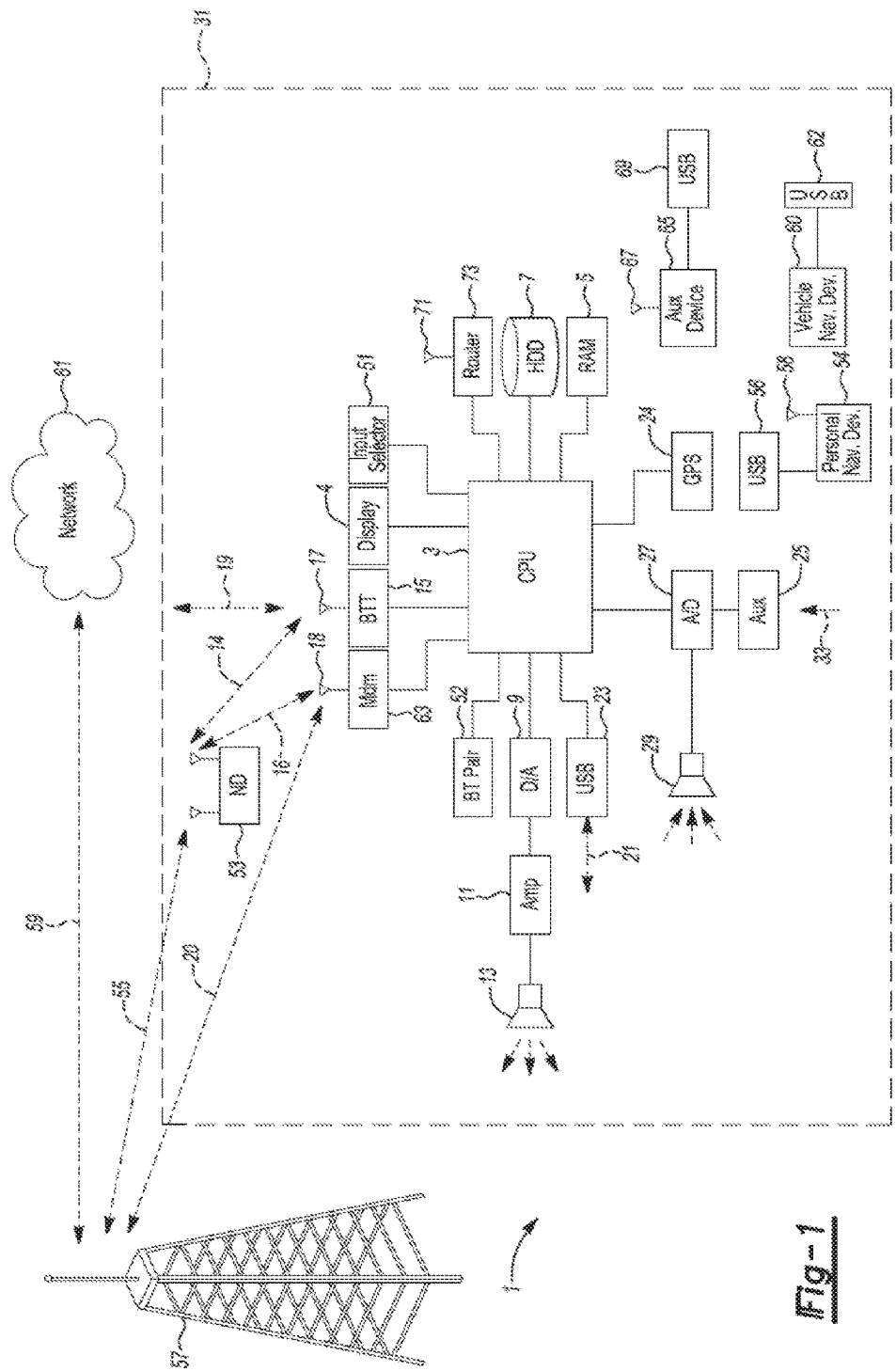
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis. For example, with respect to the illustrative embodiments, a user may input a single or series of parameters defining particular networks or SIM profiles preferred for use in particular scenarios. The manufacturer may define certain network parameters for use with certain scenarios as well, which may also be user-reconfigurable in some cases and fixedly defined or only revisable by the manufacturer in other scenarios, depending on design choice.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory. For example, without limitation, a SIM profile may be retrieved from a wired or wirelessly connected mobile device, and stored locally on the vehicle computer. This is one example of a profile that may be used in conjunction with the illustrative embodiments to provide connectivity options.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS may use a vehicle network (such as, but not limited to, a CAN bus) to pass data to and from the VCS (or components thereof). This "vehicle network" is distinguishable from a LAN or WAN providing extra-vehicular connectivity, such as a network connection established through use of an on-board SIM profile or SIM profile obtained from a connected wireless device.

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a Wi-Fi access point. Nomadic device 53 may include a subscriber identity or identification module (SIM) that includes connectivity authorizing information. Relevant information or data from the SIM module to provide cellular network connectivity, may be transferred to the VCS memory and stored in a SIM profile for subsequent use in selecting an available cellular network for vehicle connectivity during a particular journey.

Representative communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data plan associated with the nomadic device, it is possible that the data plan allows for broadband transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., Wi-Fi) or a Wi-Max network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection.

Auxiliary device 65 may include, but is not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having representative processes executed by a vehicle computing system located in a vehicle, in certain embodiments, the representative processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Vehicle telematics control units TCUs utilize connectivity options to provide wireless signal transmission and receipt between a vehicle and remote devices. Typically, this includes a cellular signal provided (as previously noted) by either an onboard vehicle modem or a user mobile device connected to the TCU. When an onboard modem is provided, it is not uncommon to include a cellular provider plan, which is frequently a different plan than the plan associated with a user cellular device.

Ambient and cellular network operating conditions may impact cellular signals available to the vehicle. For example, cellular network coverage, vehicle attenuation of signals, weather, network loads, signal obstructions (such as tall hills or buildings), electromagnetic interference, etc. may impact cellular signals. In a scenario where two occupants having wireless devices associated with different wireless carriers are traveling in a vehicle having an onboard modem associated with a third wireless carrier, any one of the three available cellular signals may be the strongest depending on the particular location during the journey. Telematics provision models are often unconcerned with the relative strength of these signals, instead simply choosing a signal at a journey's onset and changing signals only if the chosen signal is no longer available for use. This may result in greatly diminished performance or unusable telematics services during a journey where the initially chosen signal falls below its original signal strength but remains detectable. In other examples, failure to use the most powerful available or preferred signal may result in a slower user experience than could be otherwise obtained.

The illustrative embodiments include systems and methods that allow for usage of a strongest cellular signal, chosen dynamically by a vehicle computing system as the vehicle travels. The vehicle telematics control unit can use the onboard telematics hardware with SIM profiles of any available cellular device (represented by occupant wireless devices, for example) to access the network corresponding to that device. Switching between available networks may be limited by the vehicle based on associated network costs or payment responsibility in some embodiments. In general, vehicle TCU's can dynamically leverage the best available network to provide the best available signal strength and transmission rates using the onboard antenna which may be more powerful and less impacted by vehicle attenuation. This may improve the user experience by increasing throughput and reducing dropped or lost packets Further, the TCU can broadcast a Wi-Fi or other wireless signal to all occupant wireless devices within a vehicle environment, allowing those devices to also use the most powerful (or otherwise selected) signal where those particular devices have diminished or no direct cellular connectivity due to a low or lost signal, respectively. If the strongest usable signal changes (i.e., a different network signal becomes the strongest signal), the process can switch to the new network associated with the strongest signal based on the SIM profile of the device associated with the strongest signal. This switching or swapping can continue throughout a journey to ensure cellular connectivity based on all available signals. The vehicle can obtain SIM profiles of the various available devices which will provide guidance as to which networks could be used if desired. These profiles can be used to determine the signal strength of the various available networks, and communication over a strongest signal network, for example, can be obtained by using the SIM profile associated with the strongest network as a proxy for the vehicle SIM profile (connecting the vehicle TCU based on the connectivity authorization provided by the SIM profile retrieved from the mobile device to which the SIM profile corresponds).

In some instances, the system may not change networks unless a current or preferred signal is below a predetermined threshold, which can include a low signal or complete loss of signal. This reduces frequent switching when the difference between the throughput and experience achieved by switching may be unnoticeable by the users. User preferences may also be used to determine when the system switches between networks. For example, a user may prefer to use a data plan associated with a mobile device having a relatively high data limit rather than a vehicle modem data plan with a relatively low limit unless the network signal for the mobile device's cellular network is below a certain predefined threshold. The signal threshold may be specified by the user or by the OEM depending on the particular application and implementation.

In such instances where a network designated as a preferred network is present, a swap to a non-preferred network may not occur until the preferred network signal drops below a threshold (even if the vehicle modem network signal is stronger), and a swap back may occur when the preferred mobile device network signal rises above the threshold (even if the vehicle modem network signal is higher). Even subject to such constraints, the ability to dynamically swap between signals without waiting for complete signal loss can significantly improve the user experience. As new possible connection sources become lost or available (for example, due to devices changing a power state or leaving/entering the vehicle), the vehicle computing system or TCU can keep a list of available networks and respective signal strengths, so that the list of available networks will typically reflect all networks available to the vehicle at any given time. The TCU can also remove the SIM profiles of any devices with which local communication is lost, so that the device's SIM profile is not being used in the absence of the actual device.

By storing the SIM profiles of all available connected/connectable devices in the vehicle, the system can use those profiles to determine relative network strengths of networks associated with those SIM profiles, and provide connectivity based on the strongest available (or subject to another constraint) network.

Figure 2:
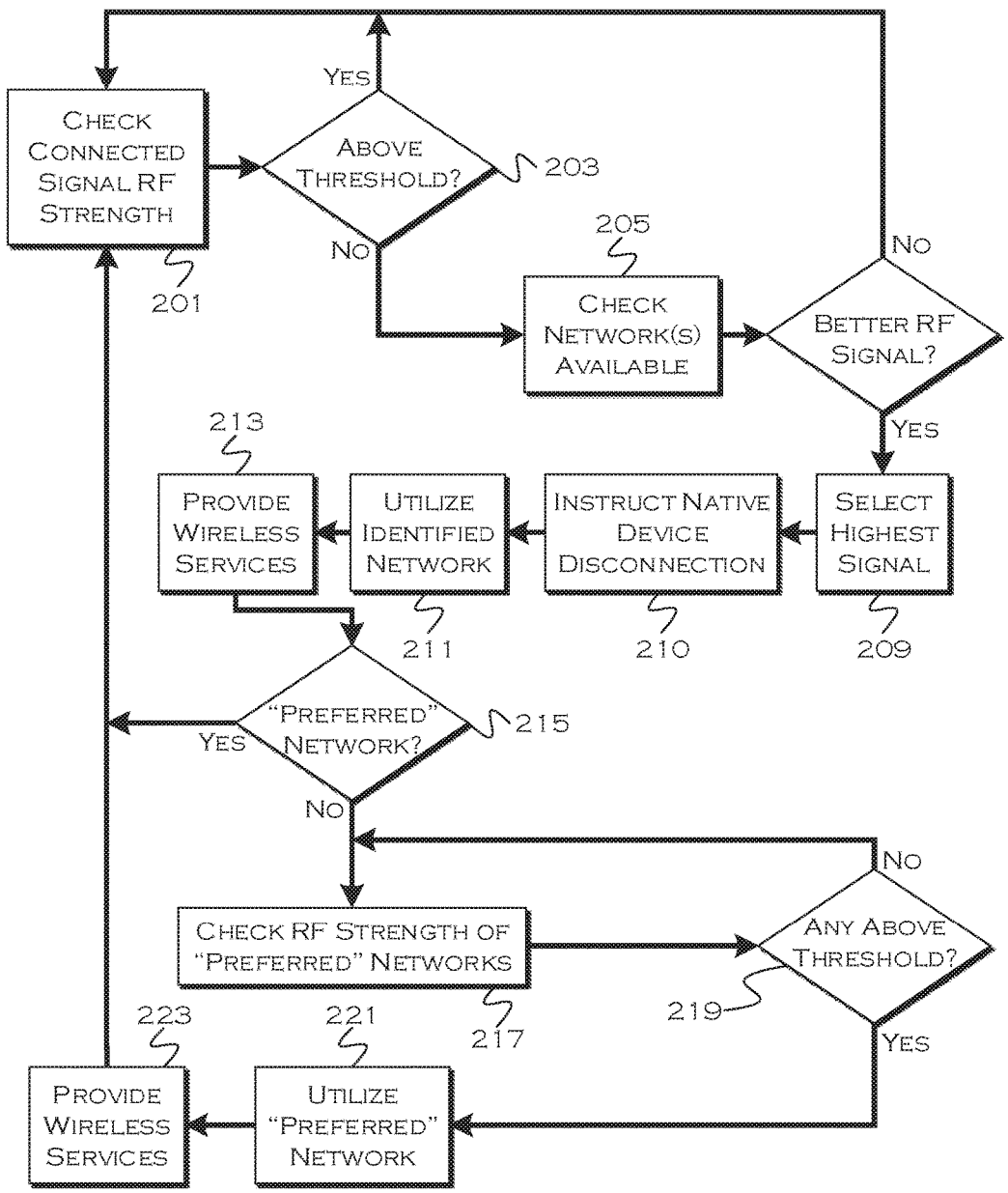
FIG. 2 shows an illustrative process for cellular signal utilization.

FIG. 2 shows an illustrative process for cellular signal utilization. With respect to the illustrative embodiments described in this figure, it is noted that a general purpose processor may be temporarily enabled as a special purpose processor for the purpose of executing some or all of the representative methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this example, a vehicle computer or TCU is already connected to an initial cellular network. Since this process could be engaged at any point in the journey, any suitable presently-connected network signal is usable as the basis for an initial determination of network strength. In a slight variation, if a preferred or primary device is present, but the network accessible on the basis of that device's SIM profile is not presently connected, the process may also include a determination as to whether or not the primary device's associated network signal is above a predetermined threshold. If the primary/preferred network signal is above the threshold, a switch to (or initial utilization of) the primary device network may be performed, even if a currently connected network signal is above the predetermined threshold for a swap.

The process begins by checking the signal strength of a currently utilized cellular network, usable based on a locally available and connectable cellular device 201. The cellular device could be either a vehicle-installed device or a device that is somehow connected or tethered to a TCU or other vehicle computing system. The process compares a current network signal strength to a predetermined signal strength (indicative of a usable or preferred minimum signal strength, for example). The predetermined signal strength can be defined by the original equipment manufacturer (OEM) or the user depending on the particular implementation. The signal strength or preferred signal may be defined according to various associated parameters such as minimum usable signal or minimum throughput, cost, etc. If the signal strength is above the threshold 203, the process may loop and continue checking signal strength until the signal strength falls below the threshold. As previously noted, this loop could also include checking the signal strength of a preferred network (if not presently connected) and swapping to the preferred network if the associated signal strength is above the threshold. This may occur even if the signal strength of the presently connected network is not below the threshold checked at 203. Different thresholds may be defined for different devices and their associated networks.

If the network signal strength of the presently connected device is below the predetermined threshold 203, the process may check the network signal strengths of any other available devices/networks 205. The TCU embedded modem monitors the signal strengths of all the cellular networks for all devices in the vehicle for which SIM profiles are available, and sorts the signal strength as a list. This can be done, for example, by periodically scanning available cellular networks and storing the SIM profiles from each device (after connecting to each device and obtaining the SIM profile) locally on the vehicle and checking the networks associated with those SIM profiles. For example, if two user devices are present in the vehicle (and both are available for connection) and a vehicle has an onboard modem, and the presently connected network signal strength is below the threshold, the process may check the signal strengths of the other networks associated with the user devices and the onboard modem.

If any of the alternative networks has a better signal strength 207 or if the signal strength of the presently connected network is below the threshold, the process will select the available network with the strongest signal for connectivity 209. In another example, the selection may also be constrained by device preferences, such that a network having a stronger signal or higher signal strength than a presently connected network, but not the highest signal strength, is selected based on other predefined criteria (e.g., without limitation, network or network associated device ranking, device/plan identification criteria, onboard device versus mobile device, etc.).

Once a different network is selected for connectivity, the process will issue a command to the consumer device (to which the SIM profile is native) of the new network to de-register from the network 210, then connect a TCU embedded modem to the new cellular network using the SIM profile associated with that network 211 and may also provide wireless connectivity (e.g., Wi-Fi) services 213 to other devices in the vehicle. This allows any present wireless device to leverage the strongest (or otherwise selected) signal in conjunction with the vehicle telematics hardware to achieve better connectivity. Presently, it is only possible for a single device to be connected to a network using a SIM profile, so the profile-providing (native) cellular device de-registers from a connected network before the TCU connects. This de-registration can be based, for example, from instruction from the TCU to the device to de-register. In other embodiments, a cellular provider may choose to use a most-recent connection request as the basis to automatically disconnect a previously registered device (such as the native device) or it may be possible to have multiple connections established based on a single set of credentials.

The process determines if the network being utilized is a preferred network 215, i.e. is the network designated as a preferred or primary network among all the presently available network options. In some instances, there will be no preferred network (if only secondarily designated user devices are present, and there is no preference of a user device over an onboard device), but in other instances a particular device may be preferred (or the use of any user device may be preferred) over an onboard modem (all other conditions, such as signal strength, being equal or within parameter boundaries). If a preferred network is being utilized, the process will loop to continue monitoring network signal strength.

If a preferred network is not presently being utilized (e.g., without limitation, if an onboard device-associated network or secondary device-associated network is being used because a preferred-primary-device network signal strength is too low), the process will check the signal strength of any present preferred networks 217. If any of the preferred networks are above the threshold designated for that network (or general threshold) 291, the process will switch utilized signals to that of the identified preferred network 221. Otherwise the process will continue to check for an available preferred network having a threshold signal strength.

Again, once the switch is made to the preferred network 221, the process will serve out a wireless connection enabled by the new network 223.

Figure 3:
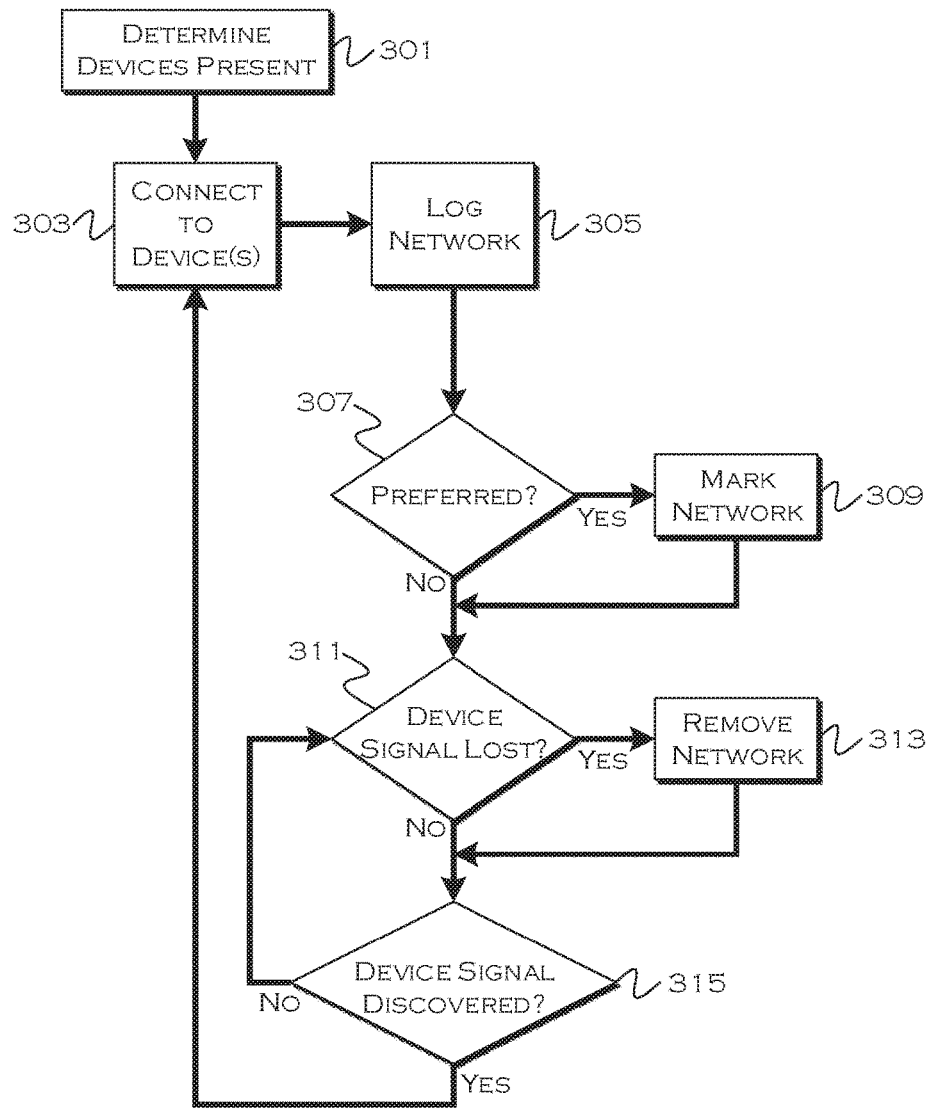
FIG. 3 shows an illustrative process for selected network registration.

FIG. 3 shows an illustrative process for selected network registration. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process determines which devices that may provide cellular connectivity SIM profiles are available in a vehicle 301. These devices may have identified themselves to the vehicle computer, or the vehicle computer may scan for available devices. The process then connects to the available device(s) 303, which can include sequential connection or multiple device simultaneous connection, depending on the capabilities and configuration of the vehicle computing system.

For each connected device, the process will log the cellular provider, SIM profile and connection/account information and available network strength (obtainable based on the SIM profile) in a network registry list 305. This process can track changes in the relative signal strengths of each network over time (because the telematics control unit can track the network signal strength based on the saved SIM profiles), so that the list will generally reflect the presently available networks and their corresponding signal strength. If the device (or network) corresponds to a preferred device or is otherwise rankably distinguishable from additional available networks, an identifier may be included on the list to identify the network as a preferred network 309.

If and when a local connectivity signal is lost from one of the network-providing devices 311, the process will remove the device from the list 313. This particular signal refers to the signal to connect the vehicle computer to the device (e.g., BLUETOOTH), not the cellular signal from the device to the network. Essentially, when the device is powered down, BLUETOOTH or other local connectivity is disabled, the device leaves the vehicle or the device is otherwise unavailable for use by the vehicle computer, this signal will be lost and the network is no longer appropriate as an option. The SIM profile is removed to prevent inadvertent use.

The process will continue to maintain the list of signals and their strengths, removing lost devices as appropriate, and if any new devices are ever powered up or brought into communicable range 315, the process will repeat to add the network identifier and any additional connection parameters for the newly available network provided by the device.

Figure 4:
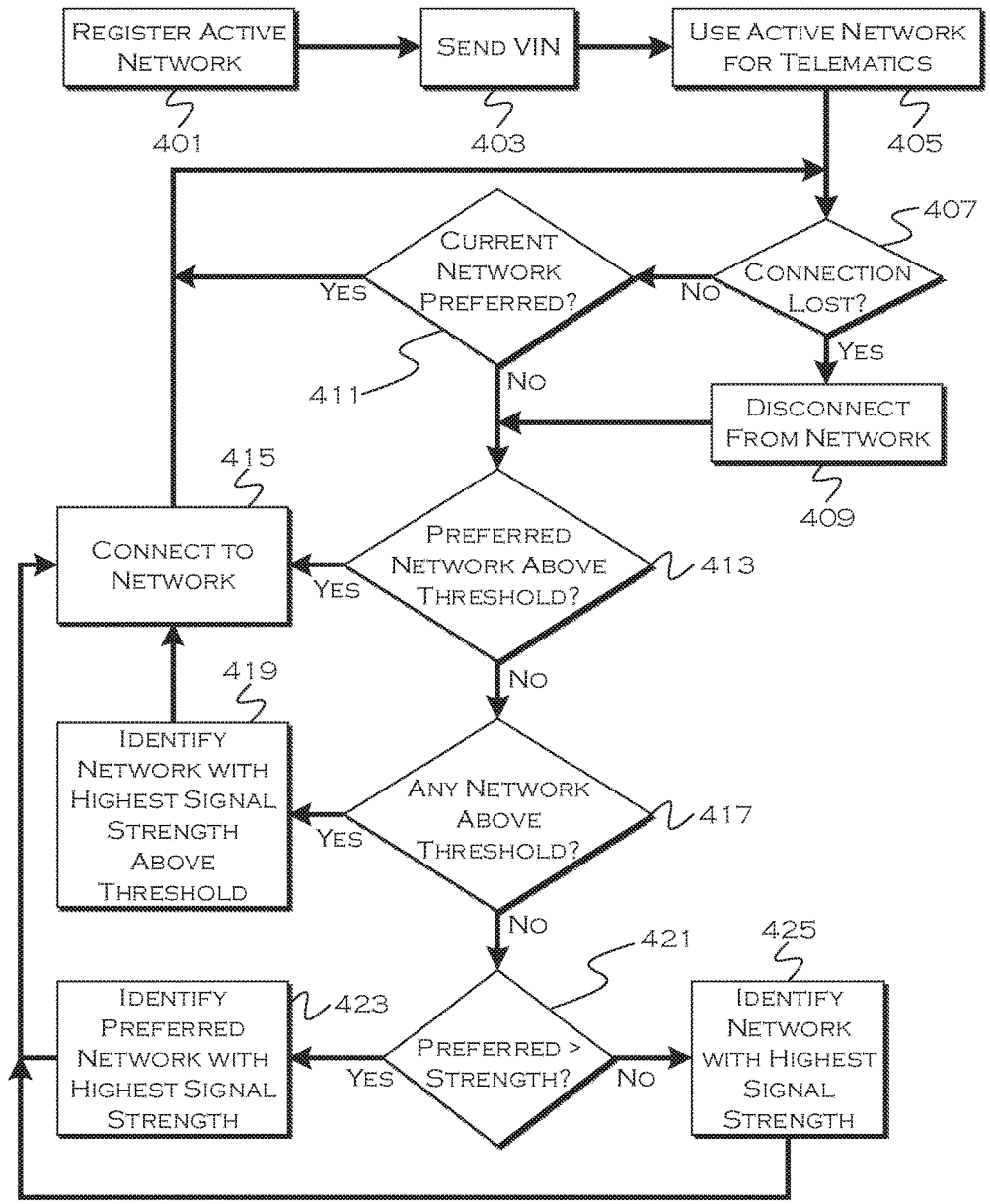
FIG. 4 shows an illustrative process for cellular signal/device selection.

FIG. 4 shows an illustrative process for cellular signal/device selection. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process registers an active cellular network (i.e., the network presently being used for connectivity) with a remote server 401. This is typically done upon connecting to a new cellular network. The remote server will use the identified network connection for communication with the vehicle, and this identification process, in this example, also includes sending a vehicle identification number (VIN) to the remote server 403. Identifying the vehicle allows the remote server to route remote access and communication requests, which may be passed through the server acting as a gateway, to the identified vehicle over the identified network.

Identifying the basis for connection (e.g., the SIM profile and/or mobile identification number) allows the gateway server to route the communication appropriately over a cellular network. Since the gateway may typically try to contact a vehicle by dialing the mobile number associated with the vehicle modem, the gateway will need to know if an alternative to the embedded vehicle SIM profile is being used for connectivity purposes, since dialing the "standard" vehicle-associated number will be ineffective in such an instance.

Also, in this example, the process begins to use the identified, registered network for telematics communication 405. This can include, but is not limited to, handling data transfer requests with remote entities, handing remote requests for vehicle data or functionality control, navigation services, etc. In this example, while the cellular network connection persists 407 (and/or remains above a predetermined threshold signal strength), a switch between networks is only made if the currently connected network is a non-preferred network and a preferred network of suitable signal strength is present.

If the cellular signal of the connected network is lost or degrades below a threshold strength 407, the process will search for a new network and disconnect from the present network 409. The connection to the present network may persist until a new network for connection is identified. Also, if the currently connected network is not a preferred network, the process may search for a preferred network above a threshold signal strength. In this example, if the currently connected network is a preferred network and has a signal strength above the predetermined threshold, the process will not seek out another network for connection. In other examples, the process may swap to another preferred network if the signal strength of the other preferred network (or other equally-weighted network) indicates that improved telematics services could be obtained.

While searching for an alternative network, the process considers if any existing, available preferred networks have signal strengths above a predetermined threshold 413 (either a threshold defined for each network individually, or for the networks in general). If there is an available preferred network with a signal strength above the threshold, the process will connect to that network instead 415, and will maintain that connection until the cellular signal is lost (or a local connection to the device providing the network availability is lost and the SIM profile is removed).

If there is no available preferred network above the threshold signal strength 413, the process will determine if there is any available network at all above the threshold signal strength 417. Again, the vehicle tracks the current network signal strengths of the networks associated with all stored SIM profiles, so at any given time the TCU knows the relative signal strengths of all available networks.

If there is any network at all above the threshold signal strength, the process will identify (if multiple networks meet this criteria) the network with the highest relative signal strength and connect to that network 419. Since at this point in the process no preferred networks meeting the signal strength criteria were found, the process will be selecting the strongest available secondary network.

If there are no available networks above the predetermine threshold strength, the process determines if a user or OEM setting indicates that a preferred network should be given preference over a greatest-remaining signal strength network 421. That is, would the user rather connect to a preferred network having below threshold signal strength, or connect to any available network having the greatest available (but below threshold) signal strength.

If the preferred network option is chose, the process will connect to the preferred network having the greatest available signal strength 423. While the signal strength in this case will be below threshold, this selection will represent the best-available preferred network. If the signal strength option is chosen, the process will simply connect to the best-available network 425, regardless of preference ranking.

By using the SIM profiles of available devices in conjunction with vehicle telematics hardware, improved signal strength may be realized while traveling. By providing the capability to dynamically swap between networks based on available signal strength of all available networks, better connectivity strength can be maintained automatically throughout a journey, without having a user instruct manual swap between available networks upon noticing that a present network signal strength has degraded. These concepts can improve an overall user in-vehicle telematics experience and reduce dissatisfaction.

While representative embodiments are described above, it is not intended that these embodiments describe all possible forms of the claimed subject matter. Rather, the words used in the specification are words of description rather than limitation, and it is understood that various changes may be made without departing from the spirit and scope of the disclosure. Additionally, the features of various implementing embodiments may be combined to form further embodiments that may not be explicitly illustrated or described.

What is claimed is:

1. A system comprising: a vehicle-based processor configured to: store SIM profiles of locally connectable wireless devices in vehicle memory; monitor cellular network signal strengths of different cellular networks associated with different stored SIM profiles as a vehicle travels; automatically select and connect to a different cellular network using an associated stored SIM profile, responsive to a signal strength of a presently connected cellular network dropping below a predetermined threshold; and wherein the processor is also configured to instruct a locally connectable wireless device, from which the associated stored SIM profile used to connect to the different cellular network was obtained, to deregister with the different cellular network prior to the processor automatically connecting to the different cellular network.

2. The system of claim 1, wherein the locally connectable wireless devices include occupant wireless devices.

3. The system of claim 1, wherein the locally connectable wireless devices include an onboard vehicle modem.

4. The system of claim 1, wherein the predetermined threshold includes a complete loss of signal.

5. The system of claim 1, wherein the processor is configured to automatically select a cellular network having a strongest signal as the different cellular network.

6. The system of claim 1, wherein the processor is configured to select a cellular network having a strongest signal and a designation as a preferred network as the different network, contingent on the signal strength of the selected network being above the predetermined threshold.

7. The system of claim 6, wherein the processor is configured to select a network not designated as a preferred network, but having a signal strength over the predetermined threshold as the different network in response to the cellular network that has the strongest signal and the designation as a preferred network not having a signal strength over the predetermined threshold.

8. The system of claim 1, wherein the processor is configured to remove the SIM profile of a locally connectable wireless device from the vehicle memory if the locally connectable wireless device is no longer connectable.

9. The system of claim 1, wherein the processor is configured to switch to a preferred cellular network in response to a network signal strength of the preferred network being above the predetermined threshold and the currently connected network not being a preferred network.

10. A computer-implemented method comprising: responsive to a signal strength of a currently connected network dropping below a predetermined threshold, automatically selecting and connecting to, via a telematics control unit, a new network from a memory stored list of networks having associated SIM profiles, the list representing wireless networks associated with locally connectable wireless devices; wherein the connecting occurs following issuance of a de-registration instruction, instructing a device, from which a SIM profile selected to provide connectivity to the new network was obtained, to de-register from the new network.

11. The method of claim 10, wherein the locally connectable wireless devices include an onboard vehicle modem.

12. The method of claim 10, wherein the predetermined threshold includes a complete loss of signal.

13. The method of claim 10, wherein the automatically selecting further includes automatically selecting a network with the highest available signal strength.

14. The method of claim 10, wherein the locally connectable wireless devices include occupant wireless devices.

15. The method of claim 10, wherein the locally connectable wireless devices include an onboard vehicle modem.

16. The method of claim 10, wherein the predetermined threshold includes a complete loss of signal.

17. The method of claim 10, wherein the automatically selecting further includes automatically selecting a network with the highest available signal strength.

18. A computer-implemented method comprising:
responsive to a determination that a signal strength of a currently connected network has dropped below a predetermined threshold, automatically selecting and connecting to, via a telematics control unit, a new network from a memory-stored list of SIM-profile-associated networks and corresponding SIM profile connection information, the list representing wireless networks associated with locally connectable wireless devices, the connection being established using the SIM profile connection information following issuance of an instruction to a device from which the SIM profile was obtained to de-register from the new network.

* * * * *